United States Patent [19]

Smith et al.

[11] Patent Number: 4,581,189
[45] Date of Patent: Apr. 8, 1986

[54] METHOD OF MAKING A BELT FOR BELT-DRIVEN RECORDING TAPE PACK

[75] Inventors: David P. Smith, North Hudson, Wis.; Robert A. von Behren, Lilydale, Minn.

[73] Assignee: Minnesota Mining and Manufacturing Company, St. Paul, Minn.

[21] Appl. No.: 608,553

[22] Filed: May 9, 1984

Related U.S. Application Data

[62] Division of Ser. No. 301,642, Sep. 14, 1981, Pat. No. 4,466,564.

[51] Int. Cl.[4] ............................................. B29C 59/00
[52] U.S. Cl. ..................................... 264/131; 264/150; 264/156; 264/162; 264/175; 264/284; 264/293
[58] Field of Search ............... 264/150, 131, 156, 162, 264/175, 284, 293

[56] References Cited

U.S. PATENT DOCUMENTS

| 383,373 | 5/1888 | Schieren . | |
|---|---|---|---|
| 627,810 | 6/1899 | Rowbotham . | |
| 1,028,783 | 5/1912 | Von Rabenau . | |
| 2,017,291 | 10/1935 | Pfleger | 74/233 |
| 2,295,432 | 9/1942 | Smith | 74/232 |
| 2,342,556 | 2/1944 | Rockoff | 264/162 |
| 2,405,496 | 8/1946 | Gingras | 74/233 |
| 2,782,461 | 2/1957 | Esslinger | 264/284 |
| 3,106,319 | 10/1963 | Fischer | 226/193 |
| 3,141,593 | 7/1964 | Selsted et al. | 226/193 |
| 3,271,229 | 9/1966 | Grabovez | 264/162 |
| 3,305,186 | 2/1967 | Burdorf et al. | 242/55.12 |
| 3,514,049 | 5/1970 | Decker et al. | 242/192 |
| 3,544,038 | 12/1970 | Smith | 242/192 |
| 3,643,892 | 2/1972 | Vogel et al. | 242/192 |
| 3,691,268 | 9/1972 | Burkley | 264/162 |
| 3,692,255 | 9/1972 | VonBehren | 242/192 |
| 3,842,152 | 10/1974 | Witfield, Jr. et al. | 264/284 |
| 3,891,405 | 6/1975 | Huber | 264/162 |
| 3,907,230 | 9/1975 | Merle et al. | 242/192 |
| 3,965,764 | 6/1976 | Avramidis | 74/221 |
| 3,980,570 | 9/1976 | Okuda et al. | 264/284 |
| 4,270,656 | 6/1981 | Chesmer et al. | 264/162 |

FOREIGN PATENT DOCUMENTS

| 1297446 | 11/1962 | France . | |
|---|---|---|---|
| 50-149770 | 12/1975 | Japan | 264/131 |

Primary Examiner—Jeffery Thurlow
Attorney, Agent, or Firm—Donald M. Sell; James A. Smith; William B. Barte

[57] ABSTRACT

In a tape which is driven by an elastic pretensioned belt, discontinuities such as embossings in the surface of the belt promote the release of air from between the belt and the underlying tape, thus minimizing variations in tape tension and tape speed.

7 Claims, 5 Drawing Figures

METHOD OF MAKING A BELT FOR BELT-DRIVEN RECORDING TAPE PACK

This is a division of application Ser. No. 301,642 filed Sept. 14, 1981, now U.S. Pat. No. 4,466,564 issued Aug. 21, 1984.

TECHNICAL FIELD

The invention concerns an improved belt for a belt-driven recording tape pack such as that disclosed in U.S. Pat. No. 3,692,255 (von Behren).

BACKGROUND ART

In the cartridge of the von Behren patent, magnetic recording tape is driven by a thin, continuous, elastic, flexible, pretensioned belt which in turn is driven by a single reversible drive motor that provides rapid acceleration and deceleration of the recording tape in either direction. In such a cartridge, pressure is exerted by the belt on the tape pack over an extended area, and the pressure arises solely from the tension in the belt. When the cartridge shown in FIG. 1 of the von Behren patent was first marketed in 1972, its recording tape had a width of ¼ inch (0.64 cm), a thickness of one mil (0.025 mm), and was driven at 30 inches (76 cm) per second. Data were originally recorded on the tape at a density of 1600 flux reversals per inch (630 per cm). The recording tapes of current cartridges may be as thin as 0.6 mil (0.015 mm) and may be driven at 90 or more inches (229 cm) per second, and data may be recorded at densities of about 10,000 flux reversals per inch (3900 per cm). At these higher tape speeds and recording densities, intimate tape-to-head contact and uniformity of tape speed have become more critical to avoid data handling errors. Intimate tape-to-head contact requires uniform tape tension, and a failure to achieve uniform tape tension is evidenced by belt slippage and variations in tape speed. Even though no problem was encountered due to variations in tape tension when the cartridge was first introduced, the higher tape speeds and recording densities have created a need for better control of tape tension in order to maintain data signal reliability.

The belts of current versions of the von Behren cartridge are made from polyurethane film having a thickness of about 5 mils (0.25 mm). For a cartridge whose hubs are on axes about 2.4 inches (6 cm) apart, the belt may be made by stamping out a ring having an outside diameter of about 1.8 inches (4.6 cm) and an inside diameter of about 1.2 inches (3.2 cm). Using rotating shafts, the ring is stretched and distorted into a cylindrical belt which is positioned around the tape pack of the cartridge. When so positioned, its length is about 15 inches (38 cm) and its width is about ⅛ inch (0.3 cm).

Recording tape packs which are driven by pretensioned elastic belts are also shown in U.S. Pat. Nos. 3,305,186 (Burdorf), 3,544,038 (Smith), 3,514,049 (Decker), and French Pat. No. 1,297,446 (Willis). Another such tape pack is interdyne's Model IU 1650.

DISCLOSURE OF INVENTION

The present invention concerns a belt for a belt-driven recording tape pack which reduces variations in tape tension by virtue of discontinuities extending over substantially the full length of the face which contacts the tape pack to promote the release of air from between the belt and the underlying tape. Like the belt of the von Behren patent, the belt of the invention is a thin, continuous, flexible belt which may have a coefficient of elasticity in the range of 0.01 to 0.25 m/nt.m and a pretension of at least 1.6 nt.

A variety of discontinuities have proven to be useful such as the discontinuities of a microscopically rough surface, that is, a peak-to-peak surface roughness ranging in size between 0.2 and 40 micrometers. A rough surface may be provided by abrading the belt or the sheet material from which the belt is made, or by applying a rough coating, or by embossing. The larger discontinuities are so fine that they cannot be individually discerned by the naked eye. Both faces of the belt may have a rough surface so that assemblers need not be concerned about which face is to contact the tape pack. The discontinuities can be provided by tiny perforations such as may be made by fine needles or by longitudinal razor slits which may be made either in the belt or in sheet material from which the belts are made. Perforations are less desirable than a rough surface because of the danger of tearing the belt. The discontinuties preferably cover the full length of the belt and are distributed over most of its width.

Figure 1:
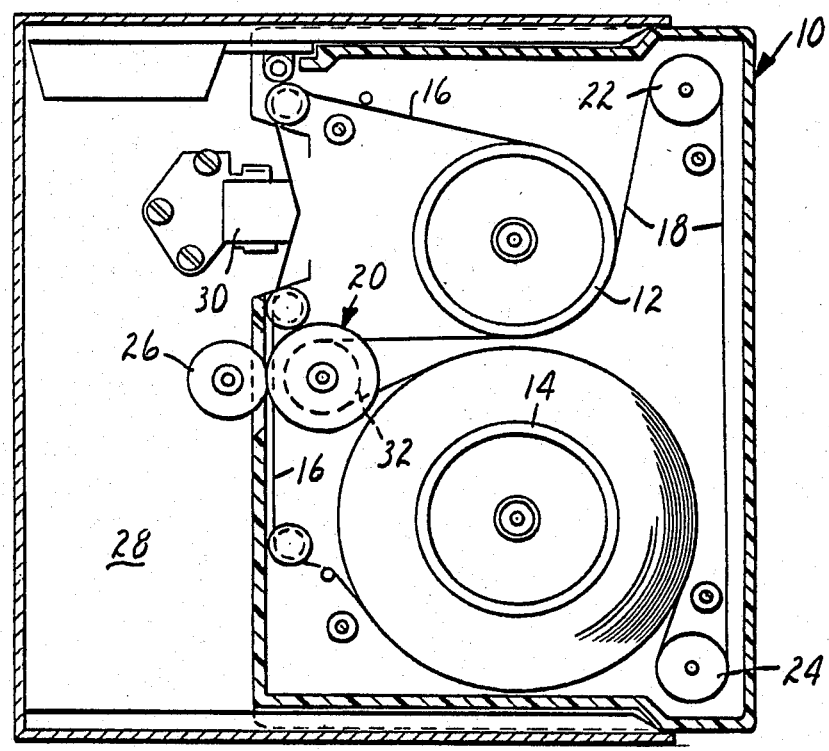
FIG. 1 schematically illustrates a belt-driven tape cartridge of the von Behren patent in position on tape deck.

The cartridge 10 shown in FIG. 1 has a pair of hubs 12 and 14 on which are wound a length of magnetic recording tape 16. A plastic belt 18 of the invention is entrained around the tape pack, a reversible belt-driving roller 20, and a pair of belt-guide rollers 22 and 24. A drive roller 26 on the tape deck 28 is contacted by the belt-driving roller 20 when the cartridge is moved into operative position as shown with the tape 16 contacting a magnetic recording head 30 on the deck 28. The belt-contacting portion 32 of the belt-driving roller 20 is recessed to permit the tape 16 to pass without touching the roller.

Figure 2:
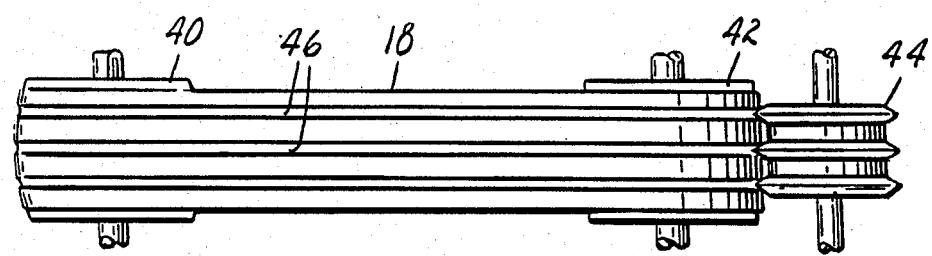
FIG. 2 shows apparatus for embossing a belt such as can be used in the cartridge shown in FIG. 1.

The belt 18 may be embossed on the apparatus shown in FIG. 2 which comprises a pair of rotating shafts 40 and 42 that may also be used to distort a ring of the belt material into a cylindrical shape. At the same time, three ridges on a third shaft 44 emboss the belt 18 against the cylindrical shaft 42 to provide three narrow linear grooves 46 extending the length of the belt. The tip of each tooth is rounded to avoid cutting the belt. Use of the belt 18 in a von Behren cartridge has minimized variations in tape tension when the embossings produced by the apparatus of FIG. 2 are not discernable to the naked eye from either face of the belt. No difference in uniformity of tape tension has been observed regardless of which face has contacted the tape pack.

Figure 3:
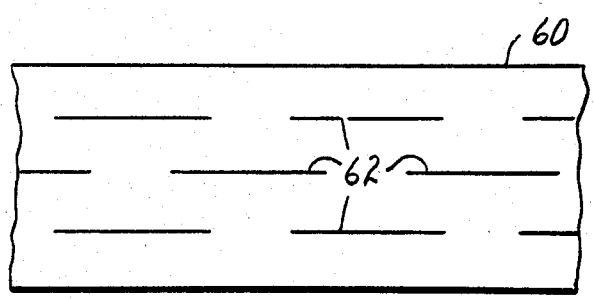
FIG. 3 shows a length of a belt having discontinuities provided by tiny perforations in the form of slits.

A plastic belt 60 as shown in FIG. 3, having slits 62 about ⅜ inch (1.0 cm) in length, has effectively minimized variations in tape tension in a von Behren cartridge.

Figure 4:
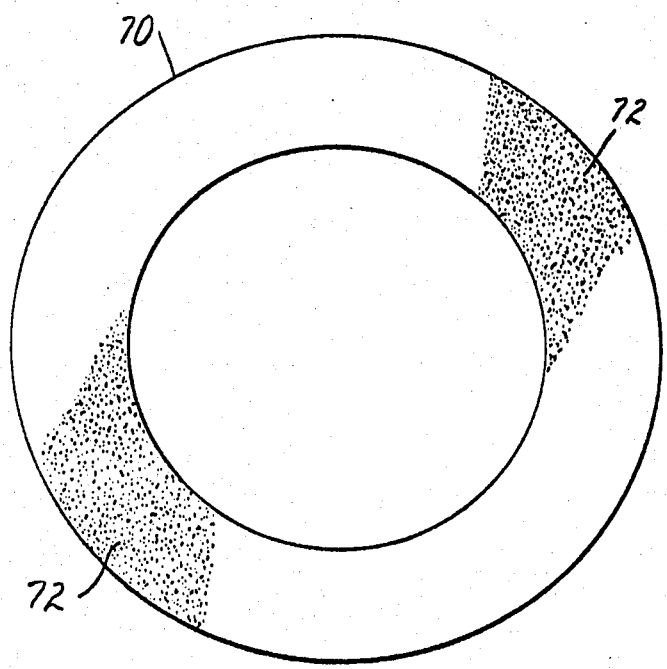
FIG. 4 shows a ring having discontinuities provided by a rough surface, which ring can be converted into a belt of the invention.

FIG. 4 shows a ring 70 having a rough surface which may be provided by abrading the sheet material from which the ring was cut or by embossing the sheet material by calendering it with roughened steel rolls. Embossing should be so performed that the sheet material is permanently deformed. Heat is known to promote permanent deformation.

Figure 5:
FIG. 5 is a fragmentary section through a ring such as that of FIG. 4, which ring has discontinuities provided by a thin surface layer containing finely divided particles.

FIG. 5 is a fragmentary section through a ring 80 such as that of FIG. 4, which ring has a thin surface layer 82 comparable to backside coatings of some magnetic recording tapes. The surface layer 82 may comprise an organic binder containing fine nonmagnetic particulate matter 84 which preferably has an average diameter of 0.1 to 0.5 micrometer and comprises 0.5 to 10 volume percent of the coating. Although resilience of the binder may make it difficult to measure, the layer 82 may have a peak-to-peak surface roughness of at least 0.2 micrometer. If its surface roughness were to exceed about 2 micrometers, it might damage the underlying magnetic recording tape during prolonged storage unless its particulate matter is fairly resilient. The color of the layer 82 may contrast from the color of underlying plastic 86 as an aid to insuring that assembler orients the layer 82 towards the tape pack. Even with no color difference, the two surfaces can be distinguished by reflectivity, but not by feel, if of the preferred surface roughness mentioned above.

Belts having discontinuities as indicated in each of FIGS. 2, 3, 4 and 5 have been tested on the von Behren cartridge at tape speeds up to 180 inches (457 cm) per second with repeated sudden stops and reversals in direction. Whenever the discontinuities contacted the tape pack, any variation in tape tension did not exceed what was considered to be inherent in the von Behren cartridge. When using a belt as shown in FIG. 5 having only one surface containing discontinuities created by abrading the belt material, significantly greater variations in tape speed were experienced when its smooth side contacted the tape pack and the tape was driven at 30 inches (75 cm) per second or more. At 60 inches (152 cm) per second or more, there were repeated sharp reductions in tape tension that were believed to be due to air entrapped between the smooth face of the belt and the outer convolution of recording tape on the take-off hub.

In an effort to study the phenomenon of possible air entrapment, one hub of a von Behren cartridge was replaced by a clear glass cylinder and the adjacent wall of the cartridge was cut away. When a drive belt was positioned in this modified cartridge and viewed from within, a belt having no discontinuities in the face contacting the glass initially appeared to make intimate contact with the glass only in small isolated areas which grew in size as the belt was kept stationary. This suggests that air was gradually being expelled due to the pressure of the belt against the glass. In contrast, a belt having discontinuities in the face contacting the glass appeared to make much better and more uniform contact with the glass, and no change in appearance was observed with passage of time.

TAPE TENSION TESTS

In a tape drive for the von Behren cartridge, the magnetic recording head was replaced by a device for sensing the tension in the magnetic recording tape. For the first tests, the tension in the tape of a cartridge using a smooth belt as in the prior art was compared at various tape speeds to the tension in the tape when using a belt embossed as shown in FIG. 2. The tension in the smooth belt was 15 ounces (4.2 newtons) and that in the embossed belt was 11.3 ounces (3.1 newtons). The latter value was deliberately kept low in order to favor the prior-art cartridge, because lower belt tensions tend to produce lower tape tensions.

The full 150 feet (46 m) of tape in each cartridge was first driven in the forward direction (hub 12 to hub 14) and then in the reverse direction at each test tape speed. Average tape tensions are reported below.

| Tape speed in inches (cm) per sec. | Average Tape Tension in ounces (newtons) | |
| --- | --- | --- |
| | Smooth belt | Embossed belt |
| Forward Direction | | |
| 30 (76) | 1.85 | 2.0 |
| 75 (190) | 1.8 | 2.3 |
| 92 (234) | 1.55 | 2.3 |
| 180 (457) | 0.85 | 2.25 |
| Reverse Direction | | |
| 30 (76) | 1.55 | 1.75 |
| 75 (190) | 1.55 | 2.15 |
| 92 (234) | 1.35 | 2.15 |
| 180 (457) | 0.9 | 2.15 |

Even at only 30 inches (76 cm) per second and in spite of lower tension within the belt itself as noted above, the embossed belt produced higher tape tension, thus indicating that it was exerting a more positive driving force. The reduced average tensions at very high tape speeds indicate that the smooth belt of the prior art was experiencing considerable slippage.

At all of the test speeds, there were greater variations in tape tension in the cartridge with the smooth belt as compared to the cartridge with the embossed belt, especially during acceleration and deceleration of the tape. At 180 inches (457 cm) per second, the tape tension repeatedly dropped to zero, indicating exceedingly large variations in tape speed.

The second tests used a polyurethane belt, one face of which had been brush-coated with a dispersion of by weight 3.75 parts rounded aluminum oxide particles having an average diameter of about 0.15–0.2 micrometer, 23 parts of conductive carbon black, 1.7 parts of dispersant, and 59 parts of a polyurethane binder composition in solvent consisting of 350 parts of tetrahydrofuran and 38 parts of toluene. The coating was dried to a thickness of about ten micrometers. After the belt was positioned on a cartridge, the coating thickness was about six micrometers, and the tension in the belt was 15 to 17 ounces (4.2 to 4.7 newtons). Tape tension was measured in the forward direction with either the coated face or the uncoated face in contact with the tape pack, with the following results:

| Tape speed in inches (cm) per sec. | Average Tape Tension in ounces (newtons) | |
| --- | --- | --- |
| | Coated face | Uncoated face |
| 15 | 2.2 | 2.1 |
| 90 | 2.1 | 1.7 |
| 180 | 2.2 | 1.4 |

We claim:

1. Method of making a thin, continuous, elastic, flexible, pretensioned belt for a belt-driven recording tape pack in which pressure is exerted by the belt on the tape pack over an extended area and arises solely from the tension in the belt, which method comprises the steps of
(1) cutting out a ring from a length of plastic sheet material,
(2) distorting the ring into cylindrical belt, and
(3) stretching the belt over a tape pack to provide a belt-driven tape pack,
wherein the improvement comprises forming a microscopically rough surface having discontinuities ranging in size between 0.2 and 40 micrometers peak to peak, such discontinuities not being discernable to the naked eye and which extend over substantially the full length of the face of the belt which contacts the tape pack to promote the release of air from between the belt and the underlying tape.

2. Method as defined in claim 1, wherein the improvement comprises forming a said microscopically rough surface extending over substantially the full length of both faces of the belt.

3. Method as defined in claim 1 wherein the improvement comprises:
forming the discontinuities in the plastic sheet material prior to step (2).

4. Method as defined in claim 3 wherein the improvement comprises:
providing said microscopically rough surface on said plastic sheet material prior to step (1).

5. Method as defined in claim 4 wherein the improvement comprises:
providing the microscopically rough surface by abrading.

6. Method as defined in claim 4 wherein the improvement comprises:
providing the microscopically rough surface by embossing.

7. Method as defined in claim 6 wherein the improvement comprises:
embossing said plastic sheet material to produce a microscopic, random embossed pattern.

* * * * *